United States Patent [19]

Holdren et al.

[11] Patent Number: 5,085,079
[45] Date of Patent: Feb. 4, 1992

[54] ACCELEROMETER WITH MOUNTING/COUPLING STRUCTURE FOR AN ELECTRONICS ASSEMBLY

[75] Inventors: Frederick V. Holdren, Bellevue; Mitchell J. Novack, Kirkland, both of Wash.

[73] Assignee: Sundstrand Data Control, Inc., Redmond, Wash.

[21] Appl. No.: 535,760

[22] Filed: Jun. 11, 1990

[51] Int. Cl.⁵ .............................. G01P 15/13
[52] U.S. Cl. ...................... 73/517 B; 73/517 R
[58] Field of Search ............ 73/514, 516 R, 517 R, 73/517 B, 517 AV, 651, 431

[56] References Cited

U.S. PATENT DOCUMENTS

| | | | |
|---|---|---|---|
| 3,702,073 | 11/1972 | Jacobs | 73/517 B |
| 4,094,199 | 6/1978 | Holdren et al. | 73/517 B |
| 4,336,718 | 6/1982 | Washburn | 73/517 B |
| 4,679,434 | 7/1987 | Stewart | 73/517 B |
| 4,700,973 | 10/1987 | Gademann et al. | 73/493 |
| 4,941,354 | 7/1990 | Russell et al. | 73/517 R |
| 5,003,824 | 4/1991 | Fukada et al. | 73/517 R |
| 5,005,414 | 4/1991 | Holland et al. | 73/517 R |

Primary Examiner—John E. Chapman
Attorney, Agent, or Firm—Christensen, O'Connor, Johnson & Kindness

[57] ABSTRACT

A mounting/coupling structure for use in an accelerometer to mount the electronics assembly with respect to the case, and to electrically couple the electronics assembly to the acceleration sensitive structure. The mounting/coupling structure may be positioned such that it provides gas damping for the paddle, and may also include means for holding the acceleration sensitive structure in a fixed position with respect to the case.

8 Claims, 4 Drawing Sheets

ACCELEROMETER WITH MOUNTING/COUPLING STRUCTURE FOR AN ELECTRONICS ASSEMBLY

FIELD OF THE INVENTION

The present invention relates to accelerometers in which an acceleration sensitive structure and an associated electronic assembly are mounted within a common case.

BACKGROUND OF THE INVENTION

A prior art accelerometer with high performance potential is described in U.S. Pat. No. 3,702,073. The accelerometer comprises three primary components, a reed, and upper and lower stators or magnetic circuits between which the reed is supported. The reed includes a movable paddle that is suspended via flexures to an outer annular support ring, such that the paddle can pivot with respect to the support ring. The paddle, flexures and support ring are commonly provided as a unitary structure composed of fused quartz.

Both upper and lower surfaces of the paddle include capacitor plates and force rebalancing coils. Each force rebalancing coil is positioned on the paddle such that the central axis of the coil is normal to the top and bottom surfaces of the paddle, and parallel to the sensing axis of the accelerometer. A plurality of mounting pads are formed at spaced-apart positions around the upper and lower surfaces of the annular support ring. These mounting pads mate with inwardly facing surfaces of the upper and lower stators when the accelerometer is assembled.

Each stator is generally cylindrical, and has a bore provided in its inwardly facing surface. Contained within the bore is a permanent magnet. The bore and permanent magnet are configured such that an associated one of the force balancing coils mounted on the paddle fits within the bore, with the permanent magnet being positioned within the cylindrical core of the coil. Current flowing through the coil therefore produces a magnetic field that interacts with the permanent magnet to produce a force on the paddle. Also provided on the inwardly facing surfaces of the stators are capacitor plates configured to form capacitors with the capacitor plates on the top and bottom surface of the paddle. Thus movement of the paddle with respect to the upper and lower stators results in a differential capacitance change.

In operation, the accelerometer is affixed to an object whose acceleration is to be measured. Acceleration of the object along the sensing axis results in pendulous, rotational displacement of the paddle with respect to the support ring and the stators. The resulting differential capacitance change caused by this displacement is sensed by a feedback circuit. In response, the feedback circuit produces a current that, when applied to the force balancing coils, tends to return the paddle to its neutral position. The magnitude of the current required to maintain the paddle in its neutral position provides a measure of the acceleration along the sensing axis.

Size is a very important constraint for many accelerometer applications, such as small air-launched missiles, and a number of attempts have therefore been made to reduce accelerometer size. For example, the size of a force rebalance accelerometer can be reduced by using only a single magnetic circuit, rather than the two magnetic circuits that are commonly used in opposition. This modification reduces the number of parts, but by less than half because parts must be present to fulfill all the original functions, i.e., to supply magnetic flux, to provide an acceleration sensitive structure including a proof mass, to servo the proof mass to its null position, and to hold a proof mass assembly in its proper relationship to the magnetic circuit, case, etc. On the other hand, using only a single magnetic circuit increases the scale factor by a factor greater than 2, and also reduces linearity.

SUMMARY OF THE INVENTION

In light of the considerations set forth above, there is a significant need for design improvements for accelerometers that are capable of reducing the overall size of the accelerometer, without tradeoffs in terms of assembly costs or performace. The present invention provides such an improvement in the form of a mounting/coupling structure for use in an accelerometer to perform a plurality of functions. These functions include the mounting of the electronics assembly with respect to the case, and electrically coupling the electronics assembly to the acceleration sensitive structure. The present invention thereby permits a reduction of the size of the accelerometer, without reducing performance or adding to the manufacturing costs. In a preferred embodiment, the present invention is usable in an accelerometer that includes an acceleration sensitive structure and an electronics assembly, both mounted within a case. The acceleration sensitive structure includes a paddle, a support, and means for supporting the paddle with respect to the support such that the paddle has a degree of freedom along the sensing axis. The acceleration sensitive structure also includes sensing means for sensing movement of the paddle with respect to the support. The electronics assembly includes a sensing circuit that when electrically coupled to the sensing means, produces a signal indicative of paddle movement, and therefore of acceleration.

The invention provides a mounting/coupling structure positioned on a first side of the acceleration sensitive structure, the mounting/coupling structure including means for mounting the electronics assembly with respect to the case, and means for electrically coupling the sensing means to the sensing circuit. Preferably, the mounting/coupling structure also includes means for holding the acceleration sensitive structure in a fixed position with respect to the case, and is preferably positioned such that it provides gas damping for the paddle. In an accelerometer that includes force rebalancing means, the mounting/coupling structure also preferably includes means for electrically coupling the electronic assembly to the force rebalancing means.

DETAILED DESCRIPTION OF THE INVENTION

Figure 1:
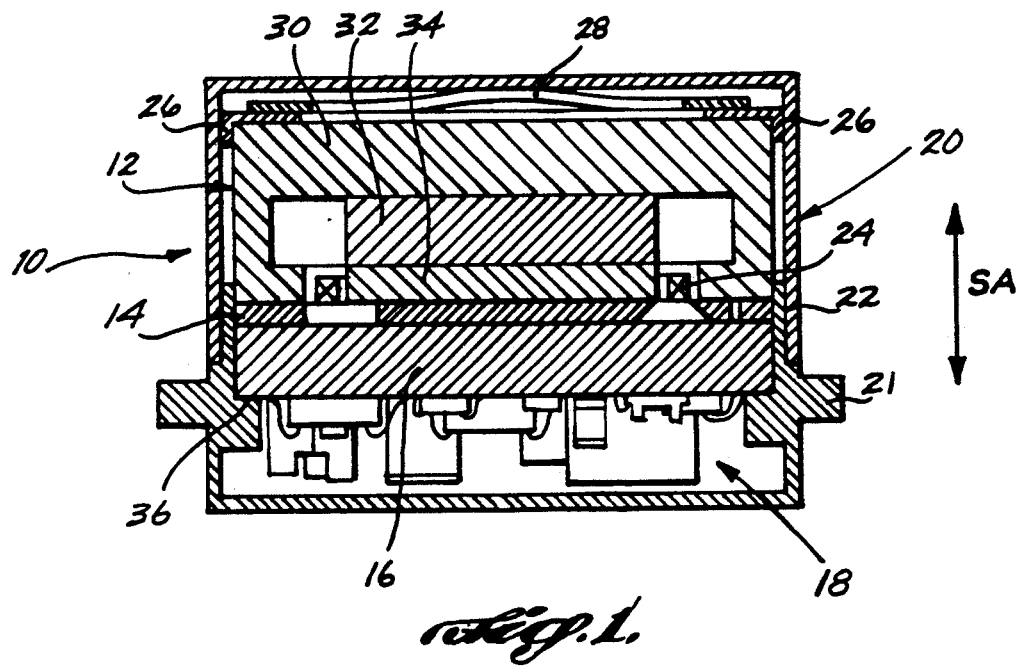
FIG. 1 is a cross-sectional view of an accelerometer that includes the mounting/coupling structure of the present invention.
Figures 2, 3:
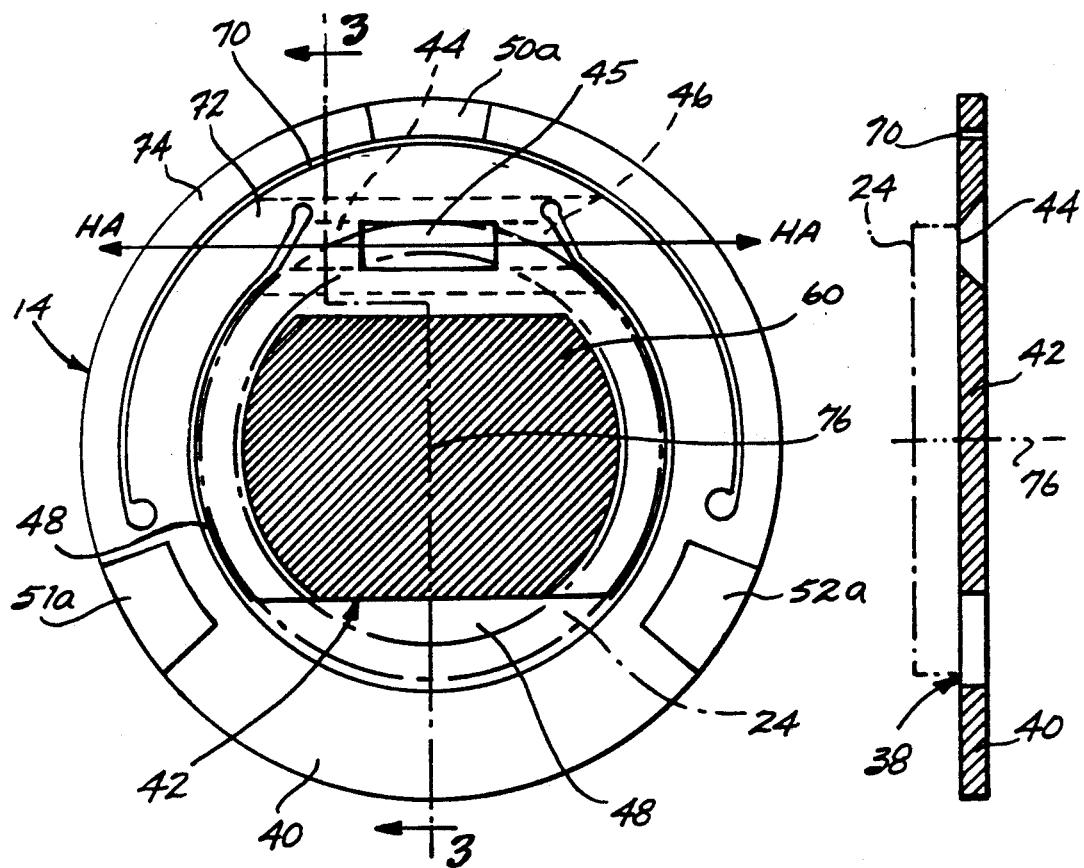
FIG. 2 is a top view of the reed of the accelerometer of FIG. 1.
FIG. 3 is a cross-sectional view taken along line 3—3 of FIG. 2.

FIGS. 1-3 illustrate an accelerometer that includes a mounting/coupling structure in accordance with the present invention. The accelerometer 10 measures acceleration along sensing axis SA, and includes stator 12, reed 14, plate 16, and electronics assembly 18, all mounted within case 20 formed by mounting flange 21 and cap 22. Reed 14 is held between plate 16 and stator 12, and has coil 24 positioned on its upper surface. Stator 12 in turn bears against cap 22 via positioning ring 26 and spring washer 28.

The stator comprises excitation ring 30, magnet 32 and pole piece 34. The stator is shaped so that coil 24 occupies a comparatively narrow gap between pole piece 34 and excitation ring 30, to provide the force rebalancing function well known to those skilled in the art. Plate 16 is held against reed 14 by inner shoulder 36 of mounting flange 21, and the mounting flange and cap 22 are interconnected by welding or by any other suitable process to form case 20. Plate 16 is formed from an electrically insulating material, preferably a ceramic. The plate includes means, further described below, for electrically interconnecting electronics assembly 18 with reed 14. Means (not shown) are also provided for coupling the electronics assembly to an electrical connector on the outer surface of mounting flange 21.

Reed 14 is shown in greater detail in FIGS. 2 and 3. The reed has an overall disk-like shape, and includes annular support ring 40 and paddle 42 connected to one another via flexures 44 and 46 that are positioned on opposite sides of opening 45. For most of its perimeter, paddle 42 is separated from support ring 40 by gap 48. Three raised mounting pads 50a, 51a, and 52a are located at approximately equally spaced positions around the upper surface of support ring 40, and three similar mounting pads 50b, and 52b (see FIG. 5) are located immediately beneath the pads 50a-52a on the lower surface of the support ring. In the assembled accelerometer, the upper mounting pads 50a-52a contact stator 12, while lower mounting pads 50b-52b contact plate 16.

Paddle 42 is mounted via flexures 44 and 46 such that the paddle can pivot with respect to support ring 40 about hinge axis HA that passes through the flexures and that is horizontal and parallel to the plane of the drawing in FIG. 2. Coil 24 is mounted on the upper surface of paddle 42, such that the outer edge of the coil is approximately coextensive with the outer edge of the paddle, except adjacent flexures 44 and 46 where the coil overhangs the flexures and opening 45. Capacitor plate 60 is positioned on the upper surface of paddle 42 within the area bounded by coil 24, and forms a capacitor with the adjacent surface of pole piece 34, or with a second capacitor plate located on the lower surface of the pole piece. The capacitor forms a portion of a pickoff circuit for detecting movement of the paddle from its null position. In the illustrated embodiment, a second capacitor is formed between capacitor plate 62 (FIG. 5) on the lower surface of paddle 42 and capacitor plate 64 (FIG. 6) on the upper surface of plate 16.

A portion of support ring 40 adjacent to the flexures is divided slot 70 into inner ring 72 and outer ring 74. Mounting pads 50a and 50b are positioned on outer ring 74 only, and the flexures are connected to inner ring 72. As a result of this arrangement, stress coupled into reed 14 via the mounting pads is isolated from the flexures. The split support ring approach allows mounting pads 50a and 50b to be located near the flexures, on outer ring 74, without creating direct mechanical coupling of the mounting pad to the flexure area of the support ring. In addition, the evenly spaced distribution of the mounting pads about the circumference of the support ring permits the center of preload force to be located almost anywhere within the diameter of the proof mass assembly. The preferred location is on centerline 76, to provide equal mounting pad loading. This low sensitivity with respect to the exact position of the center of preload force allows the use of low-cost preload techniques, such as spring washer 28 shown in FIG. 1.

Plate 16 performs a number of interreleated functions in the the illustrated accelerometer. First, as shown in FIG. 1, the plate provides a mounting structure for electronics assembly 18, and also provides a mechanical ground for reed 14 and stator 12. In addition, as described below, the plate provides electrical connections between the electronics assembly and the reed, and provides a damping surface for movement of paddle 42. In addition, the plate may also provide a portion of the pickoff circuit for detecting proof mass movement.

Figure 5:
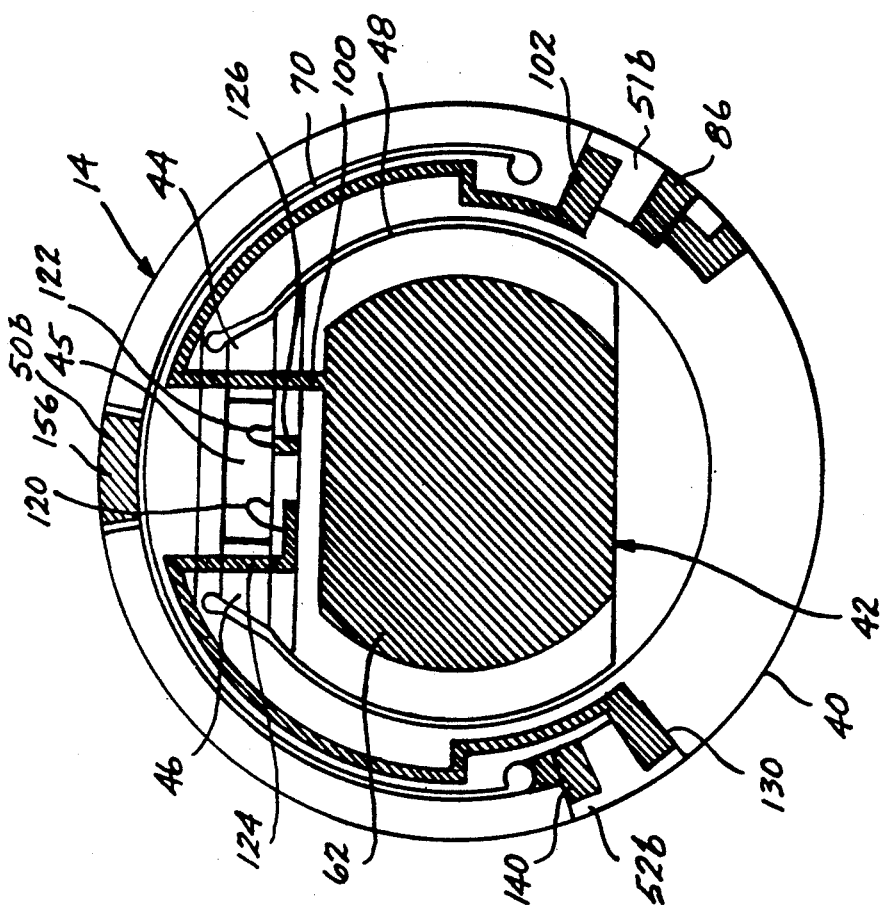
FIG. 5 is a bottom plan view of the reed, showing the electrical connections.
Figure 4:
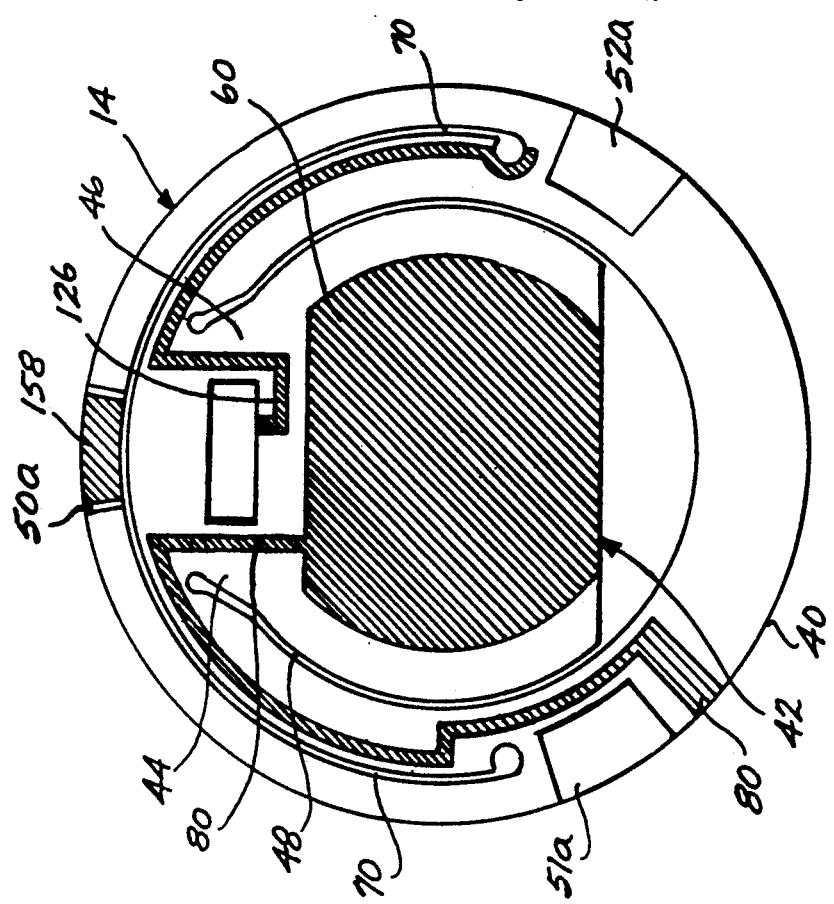
FIG. 4 is a top plan view of the reed, showing the electrical connections.
Figure 6:
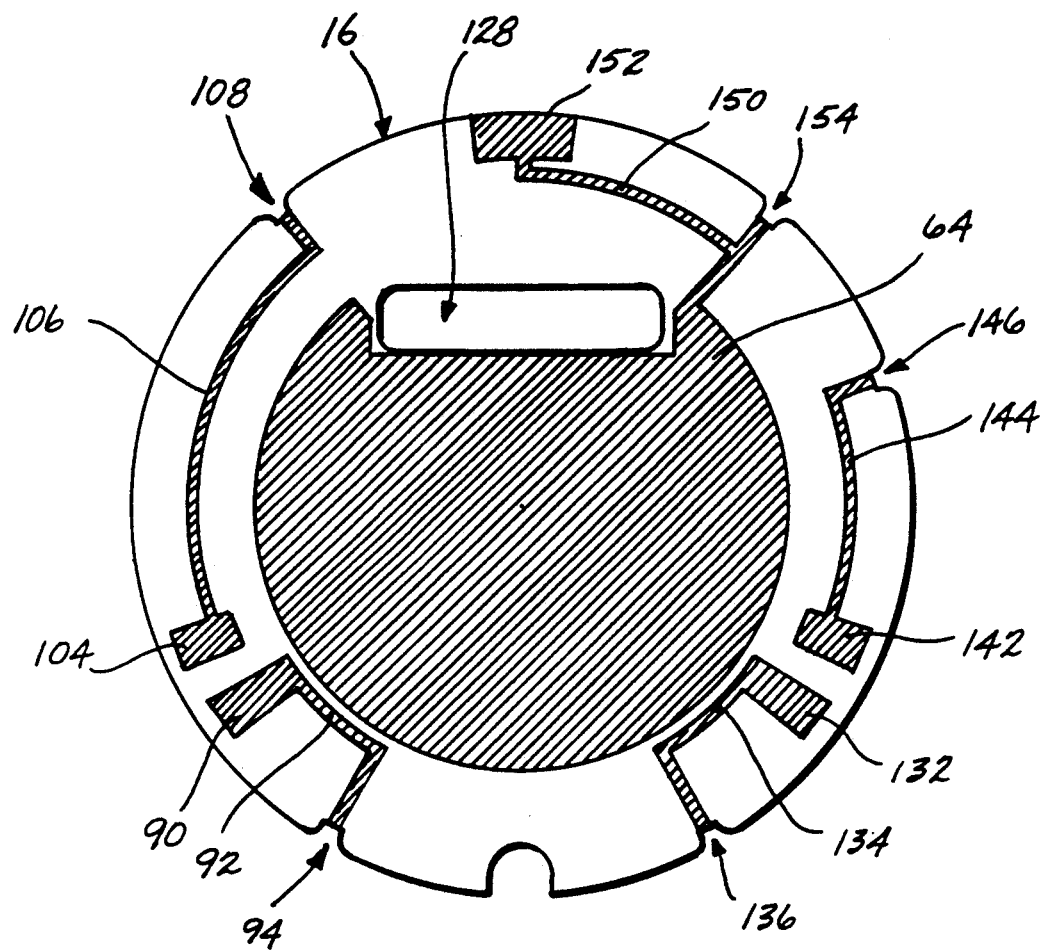
FIG. 6 is a top plan view of the plate, showing the electrical connections.

FIGS. 4-6 detail the electrical connections between electronics assembly 18 and reed 14. FIG. 4 is a view similar to that of FIG. 2, and shows paddle 42 suspended from support ring 40 by flexures 44 and 46, support ring 40 including slot 70 and mounting pads 50a-52a. The upper surface of the reed includes metal trace 80 that is connected to capacitor plate 60 on the upper paddle surface. From the capacitor plate, trace 80 crosses flexure 44, travels about one-third of the way around support ring 40 between slot 70 and gap 48, to a position past mounting pad 51a. Trace 80 then extends across the outside edge of support ring 40, and forms contact 86 on mounting pad 51b on the lower surface of reed 14, as shown in FIG. 5. Referring now to FIG. 6, in the assembled accelerometer, contact 86 on mounting pad 51b on the lower reed surface makes physical and electrical contact with contact 90 on the upper surface of plate 16. Contact 90 is connected to trace 92 that extends for a short distance around the upper surface of plate 16, and then passes to the lower surface of the plate via slot 94 to thereby complete the electrical connection between capacitor plate 60 and electronics assembly 18.

As shown in FIGS. 5 and 6, the lower surface of paddle 42 includes second capacitor plate 62 that combines with capacitor plate 64 on the upper surface of plate 16 to form a second capacitor for use in the pickoff detection system. Capacitotr plate is connected to trace 100 crosses flexure 44, extends about one-third the way around support ring 40 between gap 48 and slot 70, and forms contact 102 on mounting pad 51b. In the assembled accelerometer, contact 102 makes physical and electrical contact with contact 104 on the upper surface of plate 16. Contact 104 coupled to the electronics assembly via trace 106 that passes through slot 108.

Referring to FIG. 5, coil 24 on the upper surface of paddle 42 is connected to a pair of wires 120 and 122 that extend from the upper to the lower paddle surface via opening 45. On the lower paddle surface, wires 120 and 122 are connected to traces 124 and 126, respectively. The upper surface of plate 16 includes recess 128, to provide space for wires 120 and 122 on the adjacent paddle. Trace 124 extends across flexure 46 to support ring 40, and then extends about one-third the way around the support ring between gap 48 and slot 70, and forms contact 130 on mounting pad 52b. In the assembled accelerometer, contact 130 makes physical and electrical contact with contact 132 on the upper surface of plate 16. Contact 132 is connected to the electronics assembly by trace 134 via slot 136.

Trace 126 (FIG. 5) crosses from the lower to the upper paddle surface (FIG. 4), crosses flexure 46, and then extends about one-third the way around supporting ring 40. At the end of slot 70, trace 126 extends through the support ring, to form contact 140 on mounting pad 52b. Contact 140 makes physical and electrical contact with contact 142 on the upper surface of plate 16. Contact 142 is connected to the electronics assembly by trace 144 via slot 146.

Referring to FIG. 6, the electronics assembly includes an electrical ground that is connected via trace 150 to contact 152, trace 150 passing through slot 154 in plate 16. Trace 150 is also connected to capacitor plate 64, to thereby ground one plate of the capacitor formed between the plate and reed. Contact 152 makes physical and electrical contact with contact 156 on the lower surface of support ring 40 (FIG. 5). Contact 156 is in turn connected to contact 158 on the upper surface of support ring 40 (FIG. 4), by a metallic connection (not shown) that extends about the outer edge of the support ring. Contact 158 in turn makes physical and electrical contact to stator 12, such that the stator and its capacitor plate are also electrically grounded.

Figure 7:
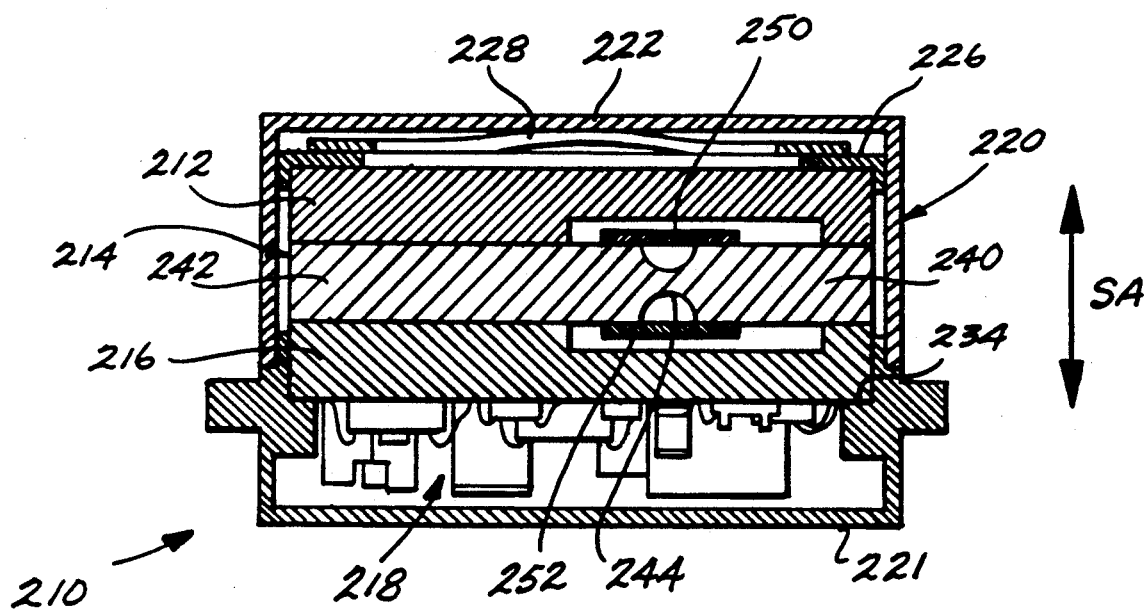
FIG. 7 is a schematic, cross-sectional view showing the mounting/coupling structure in use in a second type of accelerometer.

FIG. 7 illustrates the mounting/coupling struts of the present invention in a second type of accelerometer. Accelerometer 210 shown in FIG. 7 includes upper plate 212, reed 214, lower plate 216 and electronics assembly 218, all mounted within case 220 formed by mounting flange 221 and cap 222. Reed 214 is held between the upper and lower plates. The assembly comprising the plates and the reed is held between shoulder 234 of mounting flange 221, and insulation cap 226 that bears against cap 222 through spring washer 228. Thus the overall geometry of this embodiment is similar to that shown in FIGS. 1-3, with upper plate 212 generally replacing stator 12.

Reed 214 comprises paddle 242 connected to support 240 via one or more flexures 244. Force sensing transducers 250 and 252 are connected between support 240 and paddle 242, and measure acceleration in a manner well known to those skilled in the art.

As in the embodiments of FIGS. 1-3, lower plate 216 serves to support the reed, to provide a damping surface for the motion of pendulum 242, and also to provide electrical connections between forced transducers 250 and 252 on reed 214 and the electronic assembly. The electrical connections may be formed in a manner essentially identical to that shown in the prior embodiment, with the electrical connections from the reed to the lower plate being made by electrical contacts on the lower surface of support 240, and on the upper surface of lower plate 216.

Figure 8:
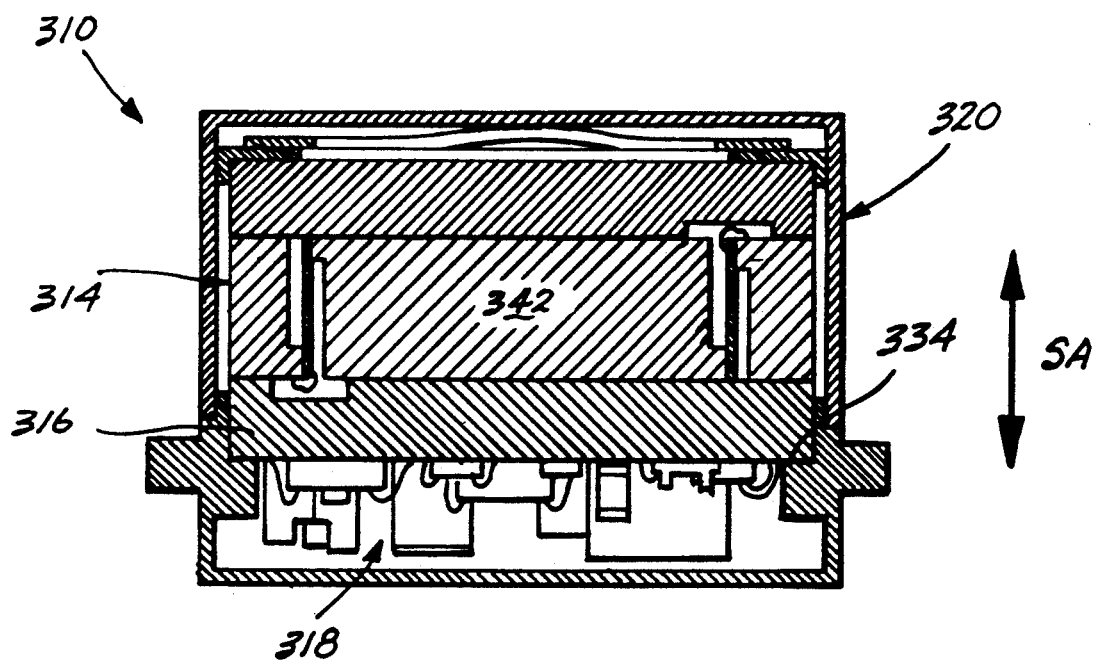
FIG. 8 is a schematic cross-sectional view showing the mounting/coupling structure in use in a third type of accelerometer.

FIG. 8 shows the mounting/coupling structure of the present invention in use in a third type of accelerometer. Accelerometer 310 is generally similar to accelerometer 210 shown in FIG. 7, except that reed 314 is configured as shown in U.S. Pat. No. 4,872,342. Once again, lower plate 316 serves as a mechanical ground for the reed and electronics assembly 318, provides a damping surface for movement of pendulum 342, provides electrical connections between the reed and the electronics assembly, and contacts case 320 at shoulder 334 to position the reed within the case.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. In an accelerometer for measuring acceleration along a sensing axis, the accelerometer comprising:
   a disk shaped acceleration sensitive structure having first and second sides and comprising a paddle, a support, means for supporting the paddle with respect to the support such that the paddle has a degree of freedom along the sensing axis, and sensing means for sensing the movement of the paddle with respect to the support;
   an electronics assembly incuding a sensing circuit, the sensing circuit including means operable when the sensing circuit is electrically coupled to the sensing means for producing a signal indicative of paddle movement with respect to the support along the sensing axis; and
   a cylindrical case within which the acceleration sensitive structure and the electronic assembly are mounted;
   the movement comprising:
   a mounting/coupling structure positioned within the case, the mounting/coupling structure comprising a disk-shaped, nonmagnetic, non-electrically conductive body having opposite first and second surfaces, the first surface being in contact with and providing support for the first side of the acceleration sensitive structure, the electronic assembly being mounted on the second surface of, and supported with respect to the case by, the mounting/coupling structure including coupling means for electrically coupling the sensing means to the sensing circuit, the coupling means comprising:
   an electrically conductive pad located on the first surface of the mounting/coupling structure in electrical contact with the sensing means, and
   an electrically conductive path located on the mounting/coupling structure and running between said pad on the first surface and the sensing circuit on the second surface.

2. The improvement of claim 1, wherein the mounting/coupling structure further includes means for holding the acceleration sensitive structure in a fixed position with respect to the case.

3. The improvement of claim 2, wherein the mounting/coupling structure further includes a surface separated from the paddle by a gap, the gap being dimensioned so as to provide gas damping of the paddle.

4. The improvement of claim 1, wherein the sensing means comprises the first capacitor plate on the paddle on the first side of the acceleration sensitive structure, and a second, adjacent capacitor plate on the first side of the mounting/coupling structure.

5. The improvement of claim 1, wherein the accelerometer further comprises force rebalancing means for maintaining the proof mass in its null position, the force balancing means comprising a magnetic circuit positioned on the second side of the acceleration-sensitive structure, and wherein the mounting/coupling structure further includes means for electrically coupling the electronic assembly to the force rebalancing means.

6. The improvement of claim 1, wherein the mounting/coupling structure provides the sole support for the electronics assembly.

7. The improvement of claim 1, wherein the case includes an inwardly projecting shoulder, and wherein the mounting/coupling structure is supported with respect to the case by said shoulder.

8. The improvement of claim 1, wherein in directions normal to the sensing axis, the mounting/coupling structure has approximately the same dimensions as the acceleration sensitive structure.

* * * * *